United States Patent Office 3,692,724
Patented Sept. 19, 1972

3,692,724
WATER EXTENDIBLE POLYESTER RESINS
John C. Van Dyk, Oklahoma City, Okla., assignor to Woods Research and Development Corp., Oklahoma City, Okla.
No Drawing. Filed July 6, 1970, Ser. No. 52,737
Int. Cl. C08f 43/02
U.S. Cl. 260—29.6 NR                          20 Claims

ABSTRACT OF THE DISCLOSURE

A solid water extended polyester resin is formed by esterifying a polycarboxylic acid with a polyol, adding a crosslinking agent, forming a water in oil emulsion stabilized by an emulsifying agent, and thereafter polymerizing the resin. The emulsifying agent is selected from benzyldimethylamine, trimethylhexamethylenediamine, isophoronediamine and morpholine.

BACKGROUND OF THE INVENTION

This invention relates to water extendible polyester resins useful as molding compositions, wood substitutes, hydraulic cements and the like. In another aspect, the present invention relates to improved processes for preparing water extendible polyester resins, i.e., methods for preparing highly stabilized emulsions of a polyester, cross-linking agent, and water, and particularly emulsifying agents for stabilizing such emulsions.

Water in oil emulsions are known to the prior art. For example, United States Patent 3,256,219 discloses a water in oil emulsion containing a polymerizable organic liquid. The emulsions disclosed in the above patent comprise a continuous oil phase, a discontinuous water phase and a catalyst system to promote setting and hardening of the emulsions. Other nonpolymerizable components may be added if desired for a particular end use.

When working with such emulsions, particularly those wherein the oil phase contains an unsaturated polyester resin, it has been observed that the water phase separates, not only under pressure, but also with time under ambient conditions. Many applications for such water extendible polyester resins require the use of significant pressures, for example, during pumping of a water extended polyester resin hydraulic cement for sealing oil well casings and the like.

Prior to the present invention, the commercially available products have not been reliable. The uncured polyester resins from which water in oil emulsions are derived have had their formulations changed many times, indicating that the producers have been striving for a more satisfactory product. All of the emulsions prepared from these commercially available products exhibit breakdown under pressure and fluid loss and separation when one attempts to store the emulsions for any length of time. The prior emulsions also require high shear mixing to form the discontinuous water phase in the uncured resin.

In addition, it has been found that desirable properties can be attributed to products which have a high water content after setting, manifested by the presence of water droplets in the water in oil emulsion. Likewise when a high content of crosslinking agent, for example styrene, is present, additional desirable properties are obtained. Products prepared from water extended resins having a high content of monomer or cross-linking agent exhibit desirable properties which make them attractive substitutes for wood. As a substitute for wood the settable polyester resins can be utilized in the manufacture of furniture, wall panels, statuettes and the like. In addition, these high monomer content water extended polyester resins have a large amount of void space present when the water component is removed after the resin has set. The high void space and ready moldability of such water extended resins also make them an attractive material for use as an insulating material, for example, for use around water or sewage lines and the like. Such compositions can be molded in situ, or can be manufactured prior to use.

Prior to the present invention, however, such water extendible polyester resins have been unsatisfactory. The price has been high making them non-competitive. Water in oil emulsions having a high water and monomer content exhibit even greater dimensional instability and pressure breakdown than do those emulsions containing a lesser amount of water and cross-linking agent or monomer. In addition, high shear mixing has been needed to form the water in oil emulsions. Further, these emulsions have had to be polymerized very quickly after being formed to prevent breakdown thereof. Prior to the present invention, these undesirable attributes have made the acceptance of such polyester resins very slow.

It is, therefore, desirable to formulate a process for preparing water extended polyester resins and an intermediate water in oil emulsion which would not have the inherent unattractive characteristics of the prior art resins. It is desirable to increase the amount of water in the water extended resin to lower the total price of the resin, thus making it more economically attractive. It is furthermore desirable to possess a water in oil emulsion which will exhibit dimensional stability over extended periods of time. It is further desirable to develop such an emulsion which will not break down and will not lose water or moisture upon being subjected to pressure. It is further desirable to develop an emulsifying technique which will allow the use of conventional low shear mixing equipment rather than high shear mixers as required by the prior water in oil emulsions.

SUMMARY OF THE INVENTION

The present invention, therefore, provides a highly stable water in oil emulsion containing a settable polyester component, a process for making a water extended polyester resin and a method of forming an emulsion containing a polyester, water and a cross-linking agent.

The water in oil emulsion comprises an unsaturated resin, an ethylenically unsaturated monomer cross-linking agent, water, and emulsifying agents selected from benzyldimethylamine, trimethylhexamethylenediamine, isophoronediamine, and morpholine. The method of forming the emulsion from a polyester, water and a cross-linking agent comprises combining the polyester, water and cross-linking agent, and admixing therewith an emulsifying agent selected from benzyldimethylamine, trimethylhexamethylenediamine, isophoronediamine, and morpholine.

The process for making a cross-linked or polymerized extended polyester resin comprises reacting a polycarboxylic acid with a polyol to form a polyester resin, with the proviso that at least one of the two polyester reactants is capable of cross-linking in the presence of a suitable cross-linking agent, combining the polyester resin with a cross-linking agent and water to form a mixture, thereafter subjecting the mixture to at least low shear agitation in the presence of an amount of an emulsifying agent selected from benzyldimethylamine, trimethylhexamethylene - diamine, isophoronediamine, and morpholine effective to form a stable water in oil emulsion from the water, polyester and cross-linking agent, and thereafter polymerizing the resin to form a solid water extended polyester.

The present invention will be better understood by reference to the ensuing specification. Upon reading it many variations, alternatives and further advantages of the process and emulsions disclosed herein will become apparent to one of ordinary skill in this art.

DEFINITION OF TERMS

To facilitate understanding of the present disclosure by those employing it, definitions of the terms used herein have been set forth. These definitions are intended as a general guideline; variations upon them will be apparent to those of ordinary skill in this art. In addition, the testing procedures utilized in the examples are described.

The term "polyester" includes the reaction product of a polyhydric alcohol and a polycarboxylic acid under esterification conditions. The term as used herein does not include the cross-linking agent or monomer which can copolymerize with the polyester to form a solid composition. "Polyester resin" is employed to denote the polyester-cross-linking agent composition, both before and after the composition has been cross-linked and polymerized. The term "polycarboxylic acid" includes those carboxylic acids which have two and three functional carboxy groups attached to a base group. Polycarboxylic acids include saturated and unsaturated aliphatic and aromatic polycarboxylic acids. The term "polyol" includes those alcohols, both aromatic and aliphatic, which contain two or more functional hydroxy groups. The term "polyol" is used synonymously with polyhydric alcohol. The term "unsaturated" is used herein to indicate the presence of vinyl or ethylenically unsaturated polymerizable radicals in the aliphatic and aromatic polycarboxylic acids and polyols. When the term "saturated" is utilized herein to further limit a term such as an aromatic dicarboxylic acid, it is to be understood that the basic benzene radical retains its identity, and that the substituents on the benzene ring are either saturated or unsaturated as the case may be.

An "acid number" or "acid value" is the number of milligrams of potassium hydroxide which are neutraized by the free acid groups present in one gram of, for example, the polyester resin. This determination is usually done by titrating a sample in hot 95% ethyl alcohol and using phenolphthalein as an indicator. The acid number is an indication of the number of unreacted carboxylic acid sites remaining after, for example, an esterification reaction. "Equivalence ratio" is used herein to provide a measure of the relative number of active substituent groups in one component of a given composition to the number of active substituent groups in another component. When utilized with respect to two acids, the ratio indicates the relative number of carboxy groups originally present in each of the two different acids prior to any reaction thereof. When utilized with respect to an acid and a polyol, the ratio is indicative of the relative number of carboxy groups to hydroxy groups prior to any reaction. When utilized to define the components of a polyester resin, the measurement is, of course, made at a point in time prior to the esterification reaction, i.e., relative to the reactants rather than the free or unreacted substituents in the product.

The ratio of the acid value to the number of milligrams of the emulsifying agent of the present invention which is used, is designated as the "neutralization equivalence ratio." The neutralization equivalence range, of course, is the range of these ratios which are usable within the scope of the present invention.

The cross-linking agents which are employed with the present invention are generally ethylenically unsaturated compounds which can polymerize and cross-link with the polyester resin. Generally, these cross-linking agents are added in the form of a monomer, which monomer forms part of the resin. A water in oil emulsion is one in which the oil phase, including the polymerizable materials and at least part of the additives, is continuous and the water phase is discontinuous. A water in oil emulsion is sometimes referred to in the art as a reverse emulsion.

The term "gel" and "gel time" as utilized herein refers to measurements of an arbitrary test formulated by the Standards Committee of the Reinforced Plastics Division of the Society of the Plastics Industry (hereafter SPI) to give a common basis for comparing the reactivity of resin systems. Data from the SPI test cannot be used to give a direct indication of the curing times required for a particular resin system, since the latter will be governed by the resin itself, the catalyst used, temperature of cure, heating source and mass of resin involved, among others. In the SPI test a standard quantity of resin, generally catalyzed with benzoyl peroxide, is placed in a test tube and lowered into a 180° F. constant temperature water bath. A thermocouple centered in the resin measures the temperature as curing proceeds. The gel time is taken as the time interval between the resin temperatures of 150° F. and 190° F. Gel time is a descriptive phrase for this time interval and does not necessarily mean that the resin actually gelled at these temperatures. Depending on the characteristics of the particular resins and the other factors described above, it may gel before or after the resin reaches 190° F. The term "cure" is utilized to indicate the formation of a solid end product.

"Separation" describes the phenomenon occurring when the resin emulsion, either by improper ingredients, improper ratios, or by its own inherent characteristics, separates into water and resin instead of remaining an emulsion. "Liquid loss" is used to describe fluid separation occurring when an emulsion is placed in a container with a very fine filter at the bottom. A pressure is thereafter exerted on the emulsion by an inert gas such as nitrogen. A measurement is taken either of the amount of resin and/or the amount of water which comes through the filter paper under these pressures. The liquid loss test is valuable on a comparative basis from varying formulations.

Another pressure test which can be utilized to compare varying formulations is conducted by the following procedure. This test consists of determining the rate at which fluid is forced from a filter press containing an emulsion sample under specified conditions of pressure and time. For the tests herein a total pressure of 100 p.s.i. is exerted on the emulsion for a period of 30 minutes. The filter press utilized in the testing procedure is a screw press frame and a filter cell assembly. The cell has an internal diameter of $3 \pm 0.07$ inches and a height of $5 \pm 0.25$ inches. The top of the cell is filled with a gasket and a machined cap which has a small hole for admitting a pressure medium. The bottom of the cell is closed by a sheet of Wholman No. 50 filter paper backed by a wire screen and a bottom cap which is gasketed to provide an effective seal. The filtration is carried on at a $100 \pm 5$ p.s.i. total pressure. A graduated cylinder is positioned to receive the filtrate. The volume accumulation of filtrate for 30 minutes is recorded as the filter loss or liquid loss and can be expressed in cubic centimeters.

DESCRIPTION OF PREFERRED EMBODIMENTS

According to the present invention, polyesters which can be utilized include those which are liquids under ambient conditions, are capable of forming a water in oil emulsion, and are capable of cross-linking in the presence of an appropriate and suitable cross-linking agent to form a solid cross-linked polyester product. The polyesters generally usable within the scope of the present invention are those which include the reaction product of polycarboxylic acids and polyols, reacted under normal esterification conditions. A preferable polyester is one containing ethylenically unsaturated groupings which can promote and be capable of cross-linking with an ethylenically unsaturated monomer. A preferable unsaturated poleyster resin is the reaction product of a polyol and an unsaturated aliphatic dicarboxylic acid and another carboxylic acid selected from a saturated aromatic dicarboxylic acid, a mixture of saturated aromatic dicarboxylic acids with saturated monocarboxylic aromatic acids, a mixture of saturated aromatic dicarboxylic acids with saturated monocarboxylic aliphatic acids and mixtures thereof. The acids of the present invention can contain up to 16 carbon atoms; preferably they have from 2 to 8 carbon atoms.

An aromatic dicarboxylic acid reactant will give the end product its most desirable characteristics for the uses disclosed herein. A monocarboxylic acid, preferably aromatic such as benzoic acid, can be included to function as a chain modifier. The presence of the monocarboxylic acid prevents the molecular chain from becoming too long by terminating the polymerization or esterification reaction. The practical effect of the presence of benzoic acid or other monocarboxylic acids is that it keeps the viscosity of the final polyester sufficiently low to permit easy mixing with a cross-linking agent. Of course, as a result, the viscosity of the uncross-linked polyester resin is desirably lower.

The aromatic dicarboxylic acids which can be utilized in preparing the polyesters of this invention are preferably the phthalic acids or their anhydrides. It is to be understood that when the term "acid" is utilized herein it includes the anhydride thereof. Phthalic anhydride is the most preferred saturated aromatic dicarboxylic acid. Halogenated acids such as fluorinated, chlorinated or brominated phthalic acids and their derivatives can also be used. In addition to the saturated aromatic dicarboxylic acids, it is preferred that an unsaturated aliphatic dicarboxylic acid be employed in conjunction therewith. Alpha, beta, unsaturated aliphatic dicarboxylic acids such as maleic anhydride, fumaric acid and itaconic acid are most preferred. The most preferred unsaturated aliphatic dicarboxylic acid is maleic anhydride. Both saturated aromatic and aliphatic monocarboxylic acids can be utilized as chain terminators to maintain the viscosity of the polyester resin at a low level. Such acids include the preferred monocarboxylic acids such as benzoic acid, o-toluic, m-toluic and p-toluic acids, and caproic acid. The aliphatic acids of this invention, both monocarboxylic and polycarboxylic, can include straight chain and cycloaliphatic structures. In addition to the dicarboxylic acids usable with the present invention, small amounts of tricarboxylic acids such as trimellitic acid or adducts of rosin with maleic acid anhydride, for example, maleopimaric acid, can be utilized.

The polyols of this invention include cyclic and acyclic polyols. Ordinarily, the polyols can contain from 2 to 16 carbon atoms; however, those containing from 2 to 8 carbon atoms are preferablly employed. Most preferred are the saturated aliphatic diols. These, of course, include the alkylene glycols. Examples of preferred alkylene glycols include ethylene and propylene glycol, with the latter being the most preferred. The glycols also can contain an additional acid group such as occurs in dimethylolpropionic acid. Examples of other glycols which can be used with the present invention are diethylene glycol, 1,6-hexane diol, neopentyl glycol, 2,2,4-trimethyl-3-pentane diol, and hydrogenated Bisphenol-A as well as mixtures thereof. Other polyols including those containing three or more hydroxy groups can also be utilized with the present invention. Examples of polyols containing more than two hydroxy groups include glycerine, pentaerythritol, dipentaerythritol, trimethylolmethane, trimethylolpropane, sorbitol, mannitol and mixtures thereof. Preferred triols are glycerol and trimethylolpropane. The best resins are obtained when the polyol is selected from diols and mixtures of diols with up to 20 mol percent of alcohols selected from triols and monocarboxylic acid alcohols.

It is preferred that the equivalence ratio of total acids, including the monocarboxylic and polycarboxylic acids, to total polyols varies between 2.0:2.0 to 2.6:2.0. A most preferred ratio is 2.1:2.0. The equivalence ratio of saturated aromatic dicarboxylic acids to unsaturated aliphatic dicarboxylic acids preferably varies between 0.7:1.3 to 1.2:1.8. A most preferred ratio is 1.0:1.0. The preferred equivalence ratio of saturated aromatic dicarboxylic acids to monocarboxylic acids is from 1.0:0 to 0:0.7. The most preferred ratio of saturated aromatic dicarboxylic acids to monocarboxylic aromatic acids is 0.95:0.05.

The polyesters of the present invention are produced under normal esterification conditions available in the prior art. For optimum results, the acid value of the polyester should fall within the range of 30 to 60, preferably from 30 to 40. The esterification of the polycarboxylic acids and polyols normally is implemented by the presence of an esterification catalyst. Suitable catalysts, although not excluding others, are salts, oxides, hydroxides or soaps of metals and alkaline earth metals. These catalysts include alkali metal soaps such as lithium naphthenate, sodium hydroxide, calcium naphthenate, lead oxide and zinc acetate. The latter compound can serve not only as an esterification catalyst, but can also prevent undesirable side reactions from occurring during the esterification process. The usual amount of esterification catalyst present in the polyester reactant mixture normally ranges from 0.01 to 0.3 weight percent based on the total reactants.

In addition, polymerization inhibitors are added to the polyester to prevent premature polymerization and cross-linking in the emulsion after the polyester is combined with a cross-linking agent. Suitable inhibitors are hydroquinone, substituted hydroquinones, such as monomethylether of hydroquinone, parabenzoquinones, naphthaquinones, or cresols such as 2,6-ditertiary butyl cresol. Other inhibitors such as copper salts, for example, copper naphthenate, and quaternary ammonium compounds can also be utilized. The quantity of inhibitor depends upon the type of polymerization and cross-linking catalysts used and other emulsion ingredients, but is usually present in an amount from 0.001% to 0.2% (weight percent) based on the total reactants.

Various cross-linking agents can be employed to set, polymerize or cross-link the polyester to form a solid resin. Those most preferred are the ethylenically unsaturated or vinyl monomers which can react with ethylenically unsaturated groups in the polyester. In addition, these ethylenically unsaturated monomers can polymerize with themselves thus contributing to a more desirable end product. A most preferred cross-linking agent is styrene. Others usable within the scope of the present invention include vinyl toluene, methylmethacrylate, other methacrylate esters, acrylonitrile, and halogenated styrenes, such as the chloro- and bromo-styrenes. Other vinyl monomers include vinyl acetate, divinyl benzene, fumarate esters, vinyl butyrate, vinyl ethers, vinyl chloride, vinylidene chloride, diallylphthalate, and triallylcyanurate. It is, of course, understood that mixtures of these monomers may also be utilized to provide an effective cross-linking agent.

As previously mentioned, inhibitors have been added to the polyester to prevent premature cross-linking and polymerization of the monomer after it is combined with the polyester. Although it is best to add the inhibitors to the polyester, they can be added to the cross-linking agent, or to both, if desired. The amount of cross-linking agent which can be added to the polyester resin can vary from 30% to 70% (weight percent) of the polyester resin-cross-linking agent mixture. Styrene is, of course, the most preferred ethylenically unsaturated cross-linking agent. A preferred amount of styrene to be utilized with the present invention ranges from 50% to 60% (weight percent) based on the polyester-styrene mixture.

The polyester, cross-linking agent and other additives such as inhibitors can be combined simultaneously with or apart from water. The components are usually placed in a mixing device which can be either of the high or low shear type. One of the advantages of the invention is that the latter can be effectively employed. Water is utilized in accordance with the present invention preferably from 50% to 80% (weight percent) of the total polyester-monomer-water mixture, most preferably from 55% to 65% (weight percent) of the mixture. Added to this mixture is one of the emulsifying agents which have been discovered for promoting the formation of and stabilizing high water content, high monomer content, water-extended polyester resin emulsions. They are:

(1) 1-amino-3-aminomethyl-3,5,5-trimethylcyclohexane (isophoronediamine)

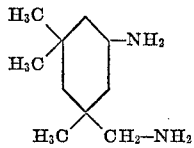

(2) 2,2,4-trimethylhexamethylenediamine (trimethylhexamethylenediamine),

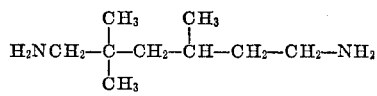

(3) tetrahydro-1,4-oxazine (morpholine)

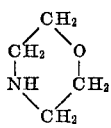

(4) benzyldimethylamine

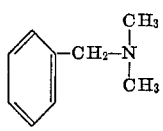

Mixtures of these agents are also effective. Best results are obtained when the emulsifying agent of the present invention is added in the preferred amount within a neutralization equivalence range of between 0.8 and 1.2.

It is believed that these emulsifying agents stabilize the emulsion formed upon mixing the polyester, monomer, water and emulsifying agent by the formation of amine soaps with the acid groups of the unsaturated polyester resin. These soaps act as a protective colloid for the emulsion and at the same time stabilize the monomer constituent. No theory about the selectivity of emulsifying agents can be proffered. There seems to be at present no reasonable explanation why some amine compounds will stabilize the emulsion described above while others which are very closely related in structure will not stabilize such an emulsion of the present invention.

Other additives such as fillers, detergents and low molecular weight polyesters can also be incorporated in the emulsion. Fillers such as calcium carbonate can be utilized. Other fillers include talc and titanium dioxide. An example of a polyalkylene ether which can be utilized with the present invention is Igepal CO–730, commercially available from General Aniline and Film Corporation located at 140 West 51st, New York, N.Y. Igepal CO–730 is a nonylphenoxypoly (ethyleneoxy) ethanol. Such surfactants, of which the Igepal polyalkylene ether products are an example, do not ionize in water, hence are nonionic or nonelectrolytic. They are not subject to hydrolysis by aqueous solutions of acid or alkali. Since they cannot form salts with metal ions, they are equally effective in hard and soft waters. Their nonionic nature makes them useful with either anionic or cationic agents, and with positively and negatively charged colloids. Such a surfactant is used for general detergency and dispersancy in the emulsion.

After the emulsion containing the polyester, cross-linking agent or monomer, water and emulsifying agent is thoroughly mixed to form a water in oil emulsion, it can be reacted to form the desired product at any location. It can be molded, for example, by pouring an amount of the emulsion into a suitable mold of predetermined shape and thereafter polymerized. In addition, the emulsions of the present invention can be stored for great lengths of time. The emulsions of the present invention can also be mixed at the site of use. For example, when utilized as a cement for filling holes in drill casings, the emulsion can be mixed and stabilized at the well site.

The polymerization of the polyester resin is carried out by the addition of vinyl polymerization initiators and accelerators. Subsequent to addition of the initiator and accelerator, depending upon the amounts of each added, the polyester resin monomer will begin to gel and solidify within a predictable amount of time. Thus, the polymerization can be controlled to occur from within a few minutes to several hours after the initiator is added. Examples of initiators which are commonly used with polyester resins are hydroperoxides, diacylperoxides, ketoperoxides or organic peracids. It is important when choosing a peroxide, either alone or in combination with the initiator and/or accelerator, that its decomposition temperature is not too high. Preferably a peroxide is chosen which permits curing at room temperature. The peroxides may be soluble or insoluble in water, both types giving good results. Hydrogen peroxide, although usable, is not preferred since it usually decomposes too fast in the emulsion environment. Diacylperoxides which are preferred are benzoyl peroxide and halogenated benzoyl peroxides. Ketoperoxides usable within the scope of this invention include methylethylketone peroxide or cyclohexanone peroxide. In addition, hydroperoxides such as tertiarybutyl hydroperoxide or cumene hydroperoxide are usable. Of the foregoing polymerization initiators, benzoyl peroxide and methylethylketone peroxide are most preferred.

Accelerators can be used to accelerate or shorten the decomposition time of the peroxides, thus permitting a shorter curing time and/or a lower curing temperature. Normally the minimum obtainable curing temperature for unsaturated polyesters is about 15° C. Accelerators which can be used within the present invention are salts and soaps of metals which exhibit more than one valency. Predominantly utilized in this area are cobalt and vanadium salts and soaps. Certain amines which function through a redox reaction in which amino oxides are formed can also be employed. It is to be recognized that each class of peroxide needs its own specific accelerator system. For diacylperoxides (benzoyl peroxide) acceleration can be obtained by utilizing certain amines such as dimethylaniline and dimethyl-p-toluidine. Cobalt salts, for example, do not accelerate the diacylperoxides. The metal salts such as cobalt naphthenate are very active accelerators for the hydroperoxides, ketoperoxides and peracids. Many cobalt activated systems can also be superactivated by the addition of the aforementioned amines. For example, a superactivation system includes methylethylketone peroxide, cobalt naphthenate and dimethylaniline. Other accelerators such as ferrocenes, mercaptans, aromatic sulfinic acids, phosphines and acetylaceton can also be used.

Of course, the choice of initiator and accelerator will depend somewhat upon the polyester resin-monomer system chosen. More important, however, is the gel time which is highly dependent upon the particular choice of initiator and accelerator for the cross-linking or resin polymerization reaction. The preferred ranges of initiators and accelerators are as follows, weight percent based on the total polyester and monomer in the emulsion: for peroxides, 0.5% to 5.0%; metal salt accelerators, 0.001% to 0.10%, based on the equivalent amount of metal relative to the emulsion; for the amine accelerators, 0.001% to 1.0%.

EXAMPLES

The following examples are included to illustrate the method by which the emulsion of the present invention can be prepared. The examples include preferred embodiments of the present invention as well as comparative examples which illustrate the advantages of the present invention. These examples are not intended to be delimitative of the scope of the present invention; they are intended as a guide to those skilled in the art who desire to reproduce and utilize the disclosed emulsion. All percentages used herein are weight percentages unless otherwise specified.

Example I

To a polyester resin, originally containing the reaction product of 40% propylene glycol, 36% phthalic anhydride, 24% maleic anhydride, to which has been added 3% benzoic acid, 0.025% lead oxide, 0.050% zinc acetate, and 0.50% hydroquinone, is added 40% styrene monomer with normal polymerization inhibition. Also added to the polyester-monomer mixture are 1.25% of a cobalt naphthenate solution containing 6% cobalt, 0.5% dimethylaniline and 1.7% benzyldimethylamine (all based on the polyester).

0.5% of a peroxide catalyst, methylethylketone peroxide, is combined with 60% water (based on the polyester-monomer mixture or total resin). The water and catalyst therein are dispersed into the resin in a conventional low shear mixing device. Samples of the emulsion are poured into a suitable mold. The water in oil emulsion remains stable during the cross-linking polymerization reaction. The polyester-monomer resin gels in 25 minutes at 20° C. After curing, the product formed is a solid, cross-linked polyester-styrene resin containing water droplets uniformly distributed throughout the solid structure.

Example II

The procedure of Example I is repeated using conventional high shear mixing to initially disperse the water in the polyester-monomer mixture. The gel time is somewhat reduced due to the heat energy added by the conversion of mechanical energy upon mixing. The solid cross-linked resin obtained exhibited substantially the same characteristic as the products obtained in Example I.

Example III

To a commercial polyester-styrene monomer mixture originally containing 35% styrene (Stepan 5928 resin, commercially available from the Stepan Chemical Company, Northfield, Ill.) is added water in the ratio of 40% resin to 60% water. Also added is 1.25% of a cobalt naphthenate solution containing 6% cobalt and 0.5% dimethylaniline (based on the resin). In addition, 2% morpholine (based on the resin) is added to the uncured resin as an emulsifying agent. Thereafter, the water is dispersed in the resin-monomer mixture by conventional low shear mixing equipment. The emulsion remains stable and intact when subjected to a pressure of 100 p.s.i. by the SPI test outlined above. No fluid loss is observed.

Thereafter, 0.5% of a peroxide catalyst (based on the resin) is dispersed into the emulsion. The water extended resin gels in 30 minutes at 20° C. A solid product is obtained characterized by water droplets dispersed through the resin.

Example IV

The procedure of Example III is repeated utilizing 2% isophoronediamine (based on the resin) to replace the morpholine. The water is dispersed into the resin-monomer mixture. The emulsion remains stable when subjected to a pressure of 100 p.s.i. Upon setting, the cross-linked polyester-styrene resin solid product is nearly the same as that obtained in Example III.

Example V

The procedure of Example III is again repeated utilizing 2% trimethylhexamethylenediamine (based on the resin) to replace the morpholine. Upon dispersion of the water, the emulsion remains stable when subjected to a pressure of 100 p.s.i. Upon adding the polymerization initiator, the emulsion gels in 25 minutes at 20° C. The solid, cross-linked polyester-styrene resin obtained is very similar to that of Example III.

Example VI

The procedure of Example III is repeated adding to the emulsion 0.5% (based on the resin) of filler material, calcium carbonate. The emulsion remains unchanged exhibiting no liquid loss or separation while subjecting it to a pressure of 100 p.s.i. After 0.5% of a peroxide catalyst is added to the emulsion, the emulsion gels in 60 minutes at a temperature of 20° C. The product obtained is similar to that obtained in Example III.

Example VII

The procedure of Example III is repeated substituting 20 grams of aniline for the morpholine. When subjected to a pressure of 100 p.s.i., the emulsion exhibits substantial fluid loss, thereby rendering the emulsion unusable.

Example VIII

The procedure of Example III is repeated, except that 20 grams isophoronemonoamine is substituted for the morpholine. The emulsion breaks during the mixing procedure, indicating that a stable emulsion can never form.

Other compounds which were tried, but which did not assist the formation of a stable emulsion, were triethanolamine, dimethylamine, monoethanolamine, lauryldimethylamine and N,N,N',N'-tetrakis(2-hydroxy propyl)ethylenediamine. These compositions are not effective emulsifying agents.

Example IX

To a commercial polyester-styrene-monomer mixture (Stepan 5928) originally containing 35% styrene is added additional styrene monomer sufficient to bring the styrene content up to about 52%. Water is added to the polyester-monomer resin mixture in a ratio of 40% resin to 60% water. To the resin-water mixture is added 2% benzyldimethylamine, 1.25% of a cobalt octoate solution containing 6% cobalt, 0.5% dimethylaniline (all based on the resin). In addition, 0.5% of a peroxide catalyst (based on the resin) is added to the resin-water mixture. Thereafter, the mixture is emulsified using conventional low shear mixing equipment. The emulsion gels in 60 minutes at 20° C. The emulsion is stable when subjected to a pressure of 100 p.s.i. The product exhibited the characteristic of having small water droplets dispersed throughout the rubbery structure.

Example X

To a commercial polyester-styrene monomer resin (Co-Rezyn 158, commercially available from Commercial Resins Div., Interplastic Corp., St. Paul, Minn.) is added an additional 17% styrene. This mixture is then combined with 50% water, 3% Igepal CO–730, 2% isophoronediamine, and 1.25% of a cobalt naphthenate solution containing 6% cobalt, 0.5% dimethylaniline, and 0.5% of a peroxide catalyst as a 25% solution (all based on original resin). The resin is emulsified at low shear. The water extended resin gels in 105 minutes at 20° C.

Example XI

The procedure of Example X is repeated substituting 2% benzyldimethylamine for the isophoronediamine. Substantially the same results are obtained.

Example XII

To a commercial polyester-styrene monomer resin (Co-Rezyn 277, commercially available from Commercial Resins Div., Interplastic Corp., St. Paul, Minn.) is added an additional 17% styrene (based on original resin). This mixture is then combined with 50% water, 3% Igepal CO–730, 2% morpholine, 1.25% of a cobalt naphthenate solution containing 6% cobalt, 0.5% dimethylaniline and 0.5% of a peroxide catalyst (all based on original resin), and emulsified at low shear. The water extended resin gels in 55 minutes at 20° C.

Example XIII

The procedure of Example XII is repeated substituting 2% trimethylhexamethylenediamine for the morpholine. Substantially the same results are obtained.

The water extended polyester resins produced by the foregoing procedures have the utility heretofore outlined. The present invention provides these resins with versatility and makes them economically attractive. Without departing from the spirit of the invention, variations upon the procedures and of the compositions disclosed herein will be apparent to those of ordinary skill in the art. The intent is that the invention be limited only by definition of the appended claims.

What is claimed is:

1. A stable dispersion of water in a polyester resin system comprising:
   a continuous phase comprising a vinyl monomer and an unsaturated polyester which is the reaction product of a polycarboxylic acid and a polyol,
   a discontinuous phase comprising water, and an emulsifying agent selected from benzyldimethylamine, trimethylhexamethylenediamine, 1 - amino-3-aminomethyl - 3,5,5 - trimethylcyclohexane and morpholine.

2. The dispersion of claim 1 wherein the monomer is styrene.

3. A water in oil emulsion of a polyester resin comprising:
   (a) an unsaturated polyester which is the reaction product of a polycarboxylic acid and a polyol,
   (b) a vinyl monomer cross-linking agent,
   (c) water, and
   (d) an emulsifying agent selected from benzyldimethylamine, trimethylhexamethylenediamine, 1 - amino-3 - aminomethyl - 3,5,5 - trimethylcyclohexane and morpholine.

4. The emulsion of claim 3 wherein the polyester has an acid number of from 30 to 60.

5. The emulsion of claim 4 wherein the emulsifying agent is present in a neutralization equivalence range of from 1.2 to 0.8.

6. The emulsion of claim 5 wherein the water comprises 50 to 80 weight percent based on the polyester-monomer-water mixture.

7. The emulsion of claim 3 wherein the monomer is styrene.

8. The emulsion of claim 7 wherein the styrene comprises from 30 to 70 weight percent based on the polyester-styrene mixture.

9. The emulsion of claim 6 wherein the polyester is the esterification product of an unsaturated aliphatic dicarboxylic acid and a carboxylic acid selected from
   (i) a saturated aromatic dicarboxylic acid,
   (ii) a mixture of saturated aromatic dicarboxylic acids with saturated aromatic monocarboxylic acids,
   (iii) a mixture of saturated aromatic dicarboxylic acids with saturated aliphatic monocarboxylic acids, and
   (iv) mixtures thereof, and
a polyol selected from diols and mixtures of diols with up to 20% by weight of alcohols selected from triols and monocarboxylic acid alcohols.

10. The emulsion of claim 9 wherein the equivalence ratio of total polycarboxylic acid to total polyol is in the range of from 2.0:2.0 to 2.6:2.0, respectively.

11. The emulsion of claim 10 wherein the equivalence ratio of total polyacid to total polyol is about 2.1:2.0.

12. The emulsion of claim 10 wherein the equivalence ratio of saturated aromatic dicarboxylic acid to unsaturated aliphatic dicarboxylic acid is in the range of from 0.7:1.3 to 1.2:1.8, respectively.

13. The emulsion of claim 12 wherein the equivalence ratio of saturated aromatic dicarboxylic acid to unsaturated aliphatic dicarboxylic acid is about 1.0 to 1.0.

14. The emulsion of claim 9 wherein the carboxylic acid is a mixture of saturated aromatic dicarboxylic acid and saturated aromatic monocarboxylic acid.

15. The emulsion of claim 14 wherein the equivalence ratio of saturated aromatic dicarboxylic acid to saturated aromatic monocarboxylic acid is about 0.95:0.05.

16. A water in oil emulsion of a polyester resin comprising:
   (a) unsaturated polyester having an acid number from 30 to 60 which is the esterification product of an unsaturated aliphatic dicarboxylic acid and a carboxylic acid selected from:
      (i) a saturated aromatic dicarboxylic acid,
      (ii) a mixture of saturated aromatic dicarboxylic acids with saturated aromatic monocarboxylic acids,
      (iii) a mixture of saturated aromatic dicarboxylic acids with saturated aliphatic monocarboxylic acids,
      (iv) mixtures thereof, and a polyol selected from diols and mixtures of diols with up to 20% by weight of alcohols selected from triols and monocarboxylic acid alcohols, and
   wherein the equivalence ratio of saturated aromatic dicarboxylic acid to unsaturated aliphatic dicarboxylic acid is in the range of from 0.7:1.3 to 1.2:1.8, and wherein the equivalence ratio of total polycarboxylic acid to total polyol is in the range of from 2.0 to 2.6:2.0, respectively;
   (b) styrene in the amount of from 30 to 70 weight percent based upon the polyester resin-styrene mixture;
   (c) water in the amount of from 50 to 80 weight percent based upon the polyester-monomer-water mixture; and
   (d) an emulsifying agent selected from benzyldimethylamine, trimethylhexamethylenediamine, 1 - amino-3 - aminomethyl - 3,5,5 - trimethylcyclohexane, and morpholine, present in a neutralization equivalence range of from 1.2 to 0.8.

17. The emulsion of claim 16 wherein the unsaturated aliphatic dicarboxylic acid is selected from maleic acid, fumaric acid and itaconic acid.

18. The emulsion of claim 17 wherein the saturated aromatic dicarboxylic acid is selected from isophthalic, terephthalic and phthalic acid.

19. The emulsion of claim 18 wherein the saturated monocarboxylic acids are selected from benzoic, o-toluic, m-toluic, p-toluic acids.

20. The emulsion of claim 19 wherein the diols are selected from alkyleneglycols having from 2 to 8 carbon atoms.

References Cited

UNITED STATES PATENTS

| | | | |
|---|---|---|---|
| 2,443,735 | 6/1948 | Kropa | 260—45.4 |
| 2,843,556 | 7/1958 | Moorman | 260—28.5 |
| 3,244,772 | 4/1966 | Von Bonin et al. | 260—861 |
| 3,442,842 | 5/1969 | Von Bonin et al. | 260—29.2 |
| 3,256,219 | 6/1966 | Will | 260—2.5 |
| 3,516,753 | 6/1970 | Dickey | 401—96 |
| 3,629,169 | 12/1971 | Bedighian | 260—22 CB |

WILLIAM H. SHORT, Primary Examiner

E. A. NIELSEN, Assistant Examiner

U.S. Cl. X.R.

260—29.6 WQ